(12) United States Patent
Meinecke et al.

(10) Patent No.: US 7,982,660 B2
(45) Date of Patent: Jul. 19, 2011

(54) MEASURING DEVICE FOR A MOTOR VEHICLE

(75) Inventors: Marc-Michael Meinecke, Sassenburg (DE); Ralph Mende, Braunschweig (DE); Marc Behrens, Braunschweig (DE); Thanh-Binh To, Barleben (DE)

(73) Assignees: Volkswagen AG, Wolfsburg (DE); S.M.S. Smart Microwave Sensors GmbH, Braunschweig (DE)

( * ) Notice: Subject to any disclaimer, the term of this patent is extended or adjusted under 35 U.S.C. 154(b) by 564 days.

(21) Appl. No.: 10/577,187

(22) PCT Filed: Sep. 21, 2004

(86) PCT No.: PCT/EP2004/010550
§ 371 (c)(1),
(2), (4) Date: May 7, 2007

(87) PCT Pub. No.: WO2005/050249
PCT Pub. Date: Jun. 2, 2005

(65) Prior Publication Data
US 2008/0068251 A1    Mar. 20, 2008

(30) Foreign Application Priority Data
Oct. 25, 2003   (DE) .................................. 103 49 919

(51) Int. Cl.
*G01S 13/58* (2006.01)
(52) U.S. Cl. ........ 342/109; 342/104; 342/105; 342/118; 356/5.01; 356/5.09
(58) Field of Classification Search ..................... 342/70
See application file for complete search history.

(56) References Cited

U.S. PATENT DOCUMENTS

| | | |
|---|---|---|
| 4,302,758 A | 11/1981 | Tomasi |
| 4,893,125 A | 1/1990 | May |
| 5,963,163 A | 10/1999 | Kemkemian et al. |
| 6,864,832 B2 | 3/2005 | Mende et al. |

(Continued)

FOREIGN PATENT DOCUMENTS

DE    29 47 803    6/1980

(Continued)

OTHER PUBLICATIONS

M. Meinecke, Radarsysteme sur automatischen Abstandsregelung in Automobilen ("Regarding Optimized Transmission Signal Design for Automobile Radars,") Technical University Hamburg-Harburg, 2001.

(Continued)

*Primary Examiner* — Thomas H Tarcza
*Assistant Examiner* — Timothy A Brainard
(74) *Attorney, Agent, or Firm* — Kenyon & Kenyon LLP

(57) ABSTRACT

A measuring device, e.g., a measuring device for a motor vehicle, is for measuring a distance between the measuring device and at least one object and/or measuring a difference in speed between the measuring device and the at least one object. The measuring device includes an emitting apparatus for transmitting a transmission signal encompassing at least two sequences of signal portions, a first sequence of signal portions and a second sequence of signal portions with two respective temporally alternating signal portions. The frequency of at least two signal portions of a sequence of signal portions differs by one respective difference frequency, the difference frequency of the first sequence of signal portions being different from the difference frequency of the second sequence of signal portions.

27 Claims, 5 Drawing Sheets

U.S. PATENT DOCUMENTS

| | | | |
|---|---|---|---|
| 6,888,492 B1 * | 5/2005 | Voles | 342/90 |
| 2003/0179128 A1 * | 9/2003 | Mende et al. | 342/70 |

FOREIGN PATENT DOCUMENTS

| | | |
|---|---|---|
| DE | 42 44 608 | 7/1992 |
| DE | 689 13 423 | 6/1994 |
| DE | 43 31 440 | 3/1995 |
| DE | 199 22 411 | 10/2000 |
| DE | 100 25 844 | 12/2001 |
| DE | 100 50 278 | 4/2002 |
| GB | 2 334 398 | 8/1999 |
| WO | WO 0231529 A2 * | 4/2002 |
| WO | WO 03/048802 | 6/2003 |

OTHER PUBLICATIONS

R. Mende, Zum optimierten Sendesignalentwurf ("Radar Systems for the Automatic Distance Control in Automobiles,") Technical University Carolo-Wilhelmina, Braunschweig, 1999.

Written Opinion of the International Searching Authority, PCT International Patent Application No. PCT/EP2004/010550 (translation of Supplemental Pages provided).

International Preliminary Examination Report, PCT International Patent Application No. PCT/EP2004/010550, Dec. 13, 2005 (translation of Supplemental Pages provided).

* cited by examiner

MEASURING DEVICE FOR A MOTOR VEHICLE

FIELD OF THE INVENTION

The present invention relates to a measuring device. For example, the present invention relates to a position measuring device, e.g., a measuring device for a motor vehicle, for measuring a distance between the measuring device and at least one object and/or for measuring a speed difference between the measuring device and the at least one object, the measuring device having an emitting device for sending a transmission signal, which includes at least two signal portion sequences, a first signal portion sequence and a second signal portion sequence, having each at least two temporally alternating signal portions, the at least two signal portions of a signal portion sequence differing in their frequency in each case by one differential frequency.

BACKGROUND INFORMATION

A measuring device developed as a radar device is described in German Published Patent Application No. 100 50 278 or from the dissertation by M.-M. Meinecke "Regarding Optimized Transmission Signal Design for Automobile Radars", Technical University Hamburg-Harburg, 2001. German Published Patent Application No. 100 50 278 describes the determination of a distance and of a relative speed of at least one distant object from an observation point with the aid of electromagnetic signals emitted from the observation point in the form of alternately emitted signal portions of a first frequency and of a second frequency, which following a reflection by the object are received and evaluated, the signal portions of the two frequencies being emitted during a measuring interval such that they are shifted in each case by one constant frequency increment.

The use of a radar device in the automotive sector is also described in the dissertation "Radar Systems for the Automatic Distance Control in Automobiles" by R. Mende, Technical University Carolo-Wilhelmina, Braunschweig, 1999, as well as German Published Patent Application No. 199 22 411, German Published Patent Application No. 42 44 608 and German Published Patent Application No. 100 25 844.

German Published Patent Application No. 199 22 411 describes a CW radar method (continues wave radar method) for measuring distances and relative speeds between a vehicle and one or several obstacles, in which a transmission signal is made up of at least four consecutive blocks having in each case different gradients. In a distance-relative speed diagram, first the intersections of all straight lines from two blocks of all discovered frequency positions are calculated. For validating these intersections, they are checked as to whether in the Fourier spectrum of a third block there exists a peak at a frequency position, whose associated straight line in the distance-relative speed diagram intersects a surrounding region of the intersection. The intersections validated in this manner are subjected to a second condition, whether in the Fourier spectrum of a fourth block there exists a peak at a frequency position, whose associated straight line in the distance-relative speed diagram intersects a surrounding region of the intersection. The intersections are regarded as valid if they satisfy both conditions.

German Published Patent Application No. 42 44 608 describes a radar method for measuring distances and relative speeds between a vehicle and obstacles in front of it, comprising an emission of continuous transmission signals, simultaneous reception of signals reflected by the obstacles during the emission of the continuous transmission signals, mixing of the reflected signals with the continuous transmission signals for obtaining inphase and quadrature signals and processing of these signals into output signals for the distances and relative speeds of the obstacles, the continuous transmission signals being broken down into constant frequency increments of constant time duration without time interval with respect to each other and at each constant frequency increment of the reflected received signal a complex sampling value being recorded and mixed with the transmission signal of the same constant frequency increment.

German Published Patent Application No. 100 25 844 describes an incrementally linear frequency-modulated transmission signal, at least two incrementally linear frequency-modulated ramps being mutually interwoven. Characteristic in this regard is the fact that these two or more ramps have a constant frequency shift with respect to one another. By frequency measurement and phase difference measurement it is possible to calculate unambiguously the distance of the object and the speed of the object from the received signals.

In addition it is describe in German Published Patent Application No. 43 31 440 to form for the radar device I/Q signal pairs for the signal evaluation, a phase shifter being connected between a radar antenna and a radar front end, an evaluation circuit having two signal channels on the input side, the radar front end being connectable via a channel switch to one of the two signal channels, the phase shifter and the channel switch being clocked synchronously and the phase shifter switching the phase between 0° and 45° with each clock cycle.

A Doppler radar device for a vehicle for indicating a distance between the vehicle and an obstacle is described in German Published Patent Application No. 689 13 423.

SUMMARY

Example embodiments of the present invention may provide a measuring device having an improved measuring accuracy, e.g., as compared to that described in German Published Patent Application No. 100 50 278. For this purpose it may be possible, with the aid of the measuring device, to keep the occurrence of so-called ghost targets low or to eliminate it entirely, to allow for a measuring time of less than 10 ms and to allow for the detection of objects at a very close range (0 m . . . 1 m) as well as at a medium and remote range.

According to example embodiments of the present invention a measuring device, e.g., a measuring device for a motor vehicle, is for measuring a distance between the measuring device and at least one object and/or for measuring a speed difference between the measuring device and the at least one object, the measuring device including an emitting device for sending a transmission signal, which includes at least two signal portion sequences, a first signal portion sequence and a second signal portion sequence, having each at least two temporally alternating signal portions, at least two signal portions of a signal portion sequence differing in their frequency in each case by one differential frequency, the differential frequency of the first signal portion sequence differing from the differential frequency of the second signal portion sequence, e.g., by at least 5%, e.g., by at least 10%.

The measuring device may include a receiving device for receiving a reflection signal of the transmission signal reflected by the at least one object and , e.g., a mixer for mixing the first signal portion sequence with a portion of the first signal portion sequence reflected by the at least one object to form a first mixed signal. The measuring device may additionally include an evaluation device for ascertaining the frequency or frequencies of the first mixed signal. The evaluation may occur with the aid of an FFT (fast Fourier transform), for example.

The evaluation device may allow for the distance between the measuring device and the at least one object and/or the speed difference between the measuring device and the at least one object to be determined as a function of the measured frequencies of the first mixed signal.

The mixer may allow for the second signal portion sequence to be mixed with a portion of the second signal portion sequence reflected by the at least one object to form a second mixed signal, and the evaluation device may allow for the measured frequencies of the second mixed signal to be ascertained.

The evaluation device may allow for the distance between the measuring device and the at least one object and/or the speed difference between the measuring device and the at least one object to be determined as a function of the measured frequencies of the first mixed signal and of the measured frequencies of the second mixed signal.

The evaluation device may allow for the difference between the absolute phase of the first mixed signal and the absolute phase of the second mixed signal to be determined.

The evaluation device may allow for the distance between the measuring device and the at least one object and/or the speed difference between the measuring device and the at least one object to be determined as a function of the difference between the phase of the first mixed signal and the phase of the second mixed signal.

The emitting device and the receiving device may each include an antenna. The emitting device and the receiving device, however, may also be implemented by a common antenna.

The emitting device may include an optical element, e.g., a laser. The receiving device may include a light-sensitive element, e.g., a photoelement or a photodiode, which may be suited for measuring the phase of the reflected laser light.

According to example embodiments of the present invention, a method is for measuring a distance between an emitting device and at least one object and/or for measuring a speed difference between the emitting device and the at least one object, a transmission signal having at least two signal portion sequences, a first signal portion sequence and a second signal portion sequence, having each at least two temporally alternating signal portions being sent by the emitting device, at least two signal portions of a signal portion sequence differing in their frequency in each case by a non-constant differential frequency. The differential frequency of the first signal portion sequence may differ from the differential frequency of the second signal portion sequence, e.g., by at least 5%, e.g., by at least 10%.

A reflection signal of the transmission signal reflected by the at least one object may be received, e.g., the first signal portion sequence may be mixed with a portion of the first signal portion sequence reflected by the at least one object to form a first mixed signal, and e.g., the dominating (measured) frequencies of the first mixed signal may be ascertained.

The distance between the emitting device and the at least one object and/or the speed difference between the emitting device and the at least one object may be determined as a function of the dominating frequencies of the first mixed signal.

The second signal portion sequence may be mixed with a portion of the second signal portion sequence reflected by the at least one object to form a second mixed signal, and the dominating frequencies of the second mixed signal may be ascertained.

The distance between the emitting device and the at least one object and/or the speed difference between the emitting device and the at least one object may be determined as a function of the dominating frequencies of the first mixed signal and of the dominating frequencies of the second mixed signal.

The difference between the phase of the first mixed signal and the phase of the second mixed signal may be determined, and the distance between the emitting device and the at least one object and/or the speed difference between the emitting device and the at least one object may be determined as a function of the differences between the phases of the first mixed signal and the phases of the second mixed signal.

A motor vehicle in present context may include a land vehicle that may be used individually in road traffic. However, motor vehicles in the present context should not be considered to be restricted to land vehicles having an internal combustion engine.

Further aspects and details are of example embodiments of the present invention are described in more detail below with reference to the appended Figures.

DETAILED DESCRIPTION

Figure 1:
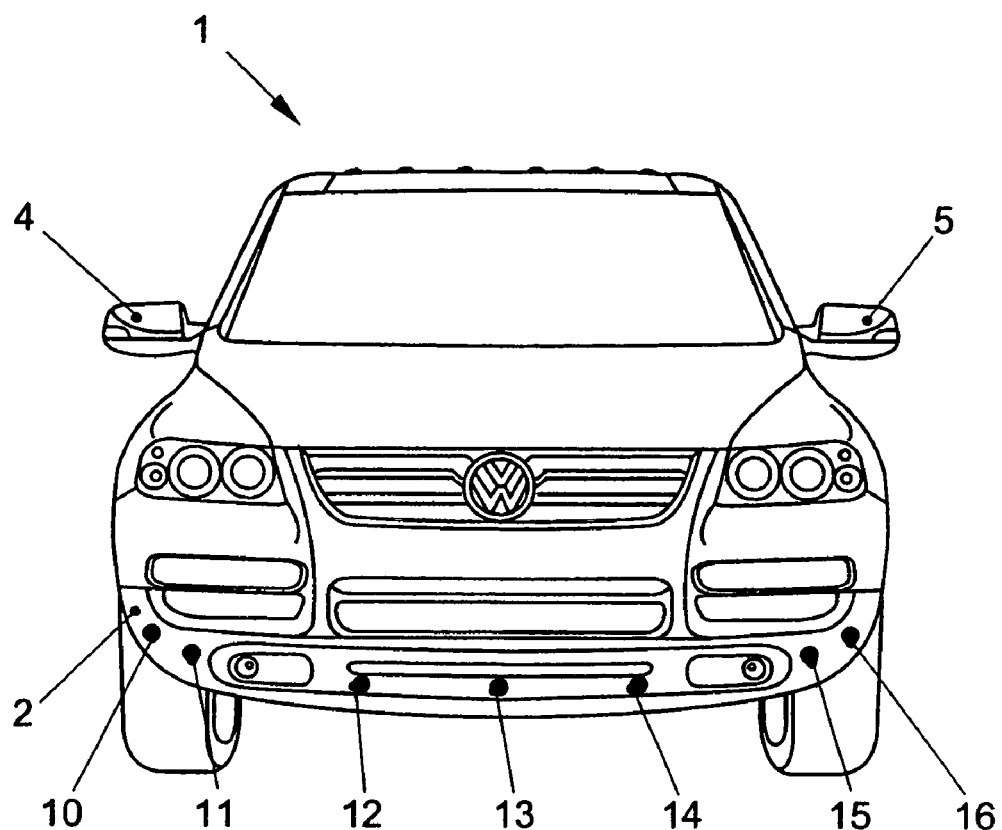
FIG. 1 is a front view of a motor vehicle.
Figure 2:
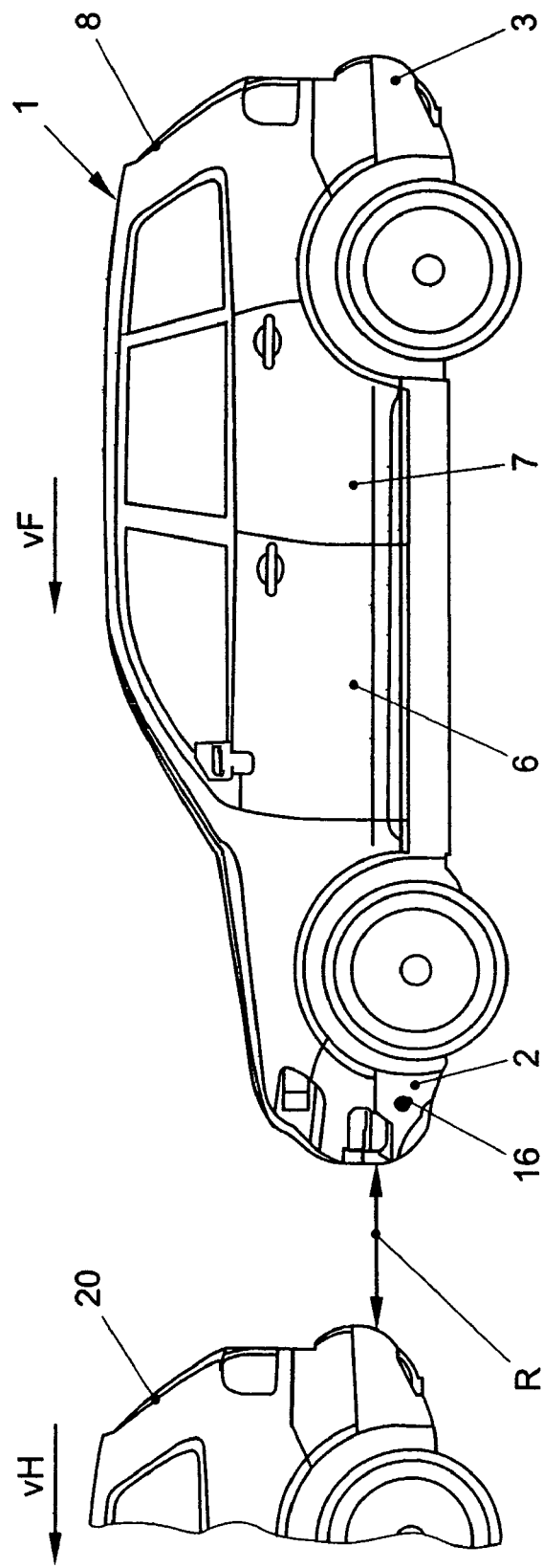
FIG. 2 is a side view of a motor vehicle.

FIG. 1 and FIG. 2 illustrate a motor vehicle 1 in an exemplary embodiment. FIG. 1 is a front view of motor vehicle 1, and FIG. 2 is a side view of motor vehicle 1. Motor vehicle 1 has a front bumper 2 and a rear bumper 3. In the exemplary embodiment illustrated, front bumper 2 has distance and/or speed sensors 10, 11, 12, 13, 14, 15, 16 for measuring a distance R between motor vehicle 1 and at least one object or obstacle 20 such as another motor vehicle, for example, and/or for measuring a speed difference v between motor vehicle 1 and the at least one object or obstacle 20, speed difference v being the difference between the speed vH of obstacle 20 and the speed vF of motor vehicle 1.

Depending on the application of distance and/or speed sensors 10, 11, 12, 13, 14, 15, 16, more or fewer distance and/or speed sensors may be arranged on bumper 2. This means that it is also possible that only one sensor is used. Alternatively or additionally, distance and/or speed sensors may also be arranged on rear bumper 3, on side mirrors 4, 5, on side doors 6, 7, on A, B, C pillars and/or on a hatchback 8, etc. The distance and/or speed sensors may be oriented in different directions and/or at different levels. Examples of the application of such distance and/or speed sensors are described in "Radar Systems for the Automatic Distance Control in Automobiles" by R. Mende, Technical University Carolo-Wilhelmina, Braunschweig, 1999.

Figure 3:
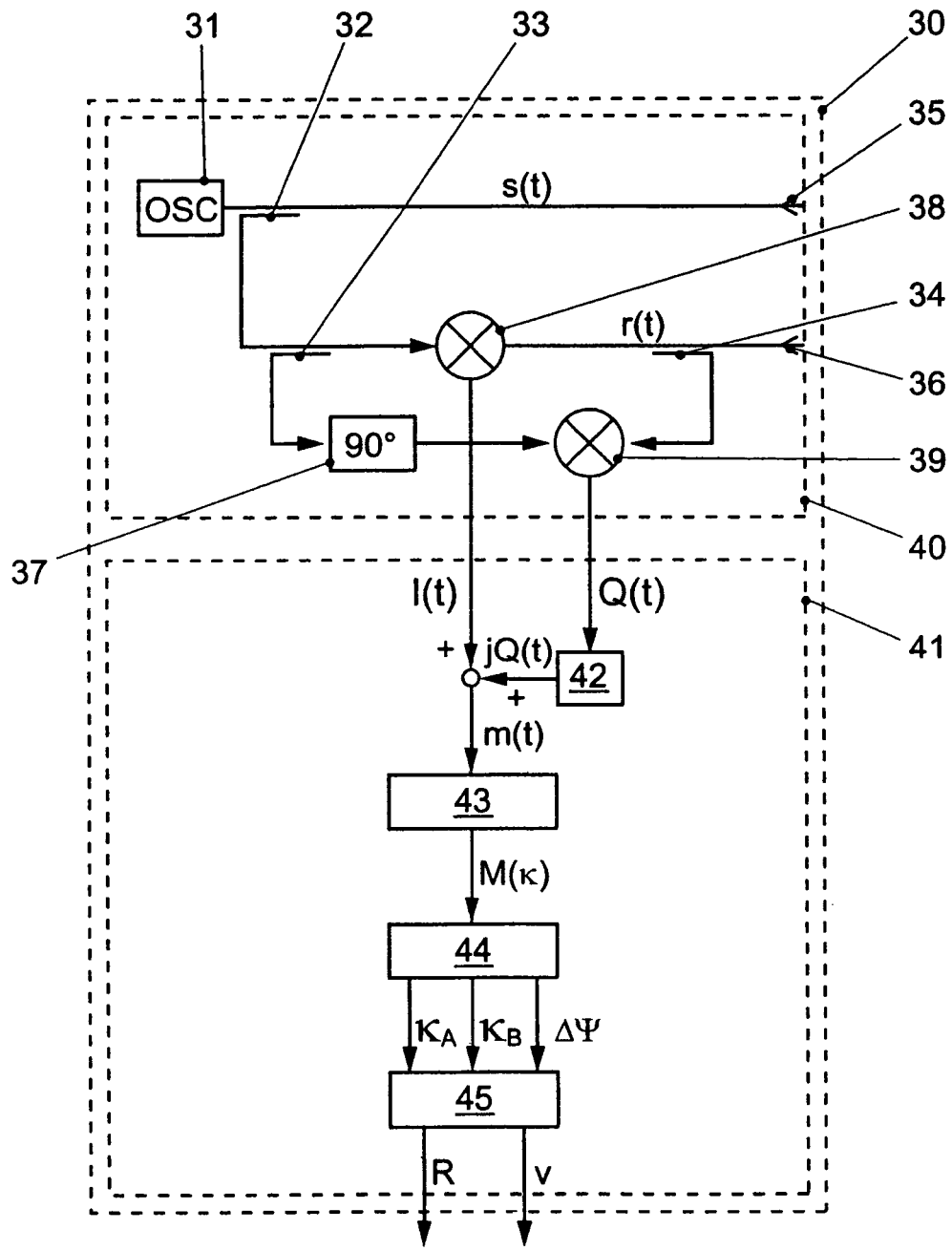
FIG. 3 illustrates an exemplary embodiment of a radar device.

FIG. 3 illustrates a radar device 30, which is usable as a distance and/or speed sensor 10, 11, 12, 13, 14, 15, 16, for example. Radar device 30 has a radar sensor 40 and an evaluation device 41. Radar device 30 has an oscillator or a signal generator 31 for producing a transmission signal s(t), a transmitting antenna 35 for emitting the transmission signal s(t) and a receiving antenna 36 for receiving a reflection signal r(t)

of the emitted transmission signal s(t) reflected by an object such as obstacle 20. t indicates time in this context.

Figure 4:
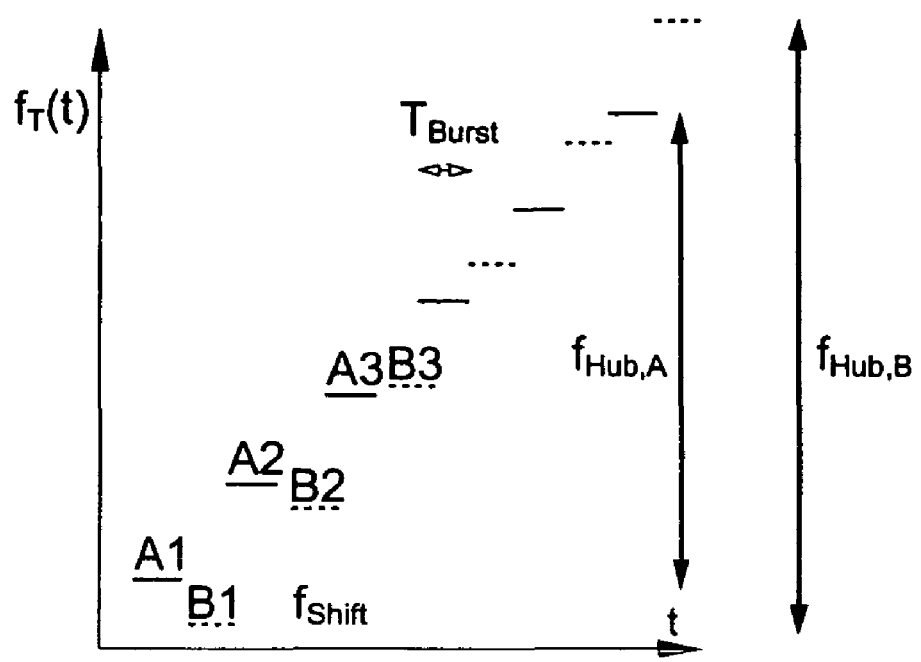
FIG. 4 illustrates an exemplary embodiment of a frequency-time diagram.

Transmission signal s(t) produced by signal generator 31 includes at least two signal portion sequences, a first signal portion sequence and a second signal portion sequence, having each at least two temporally alternating signal portions, the at least two signal portions of a signal portion sequence differing in their frequency in each case by one differential frequency, and the differential frequency of the first signal portion sequence differing from the differential frequency of the second signal portion sequence, e.g., by at least 5%, e.g., by at least 10%. An exemplary embodiment of such a transmission signal is illustrated in FIG. 4 in a frequency-time diagram.

In this context, A1, A2, A3, . . . indicate the signal portions of a first signal portion sequence A(t) and B1, B2, B3, . . . indicate the signal portions of a second signal portion sequence B(t). Such signal portions are also called chirps. In the present exemplary embodiment, the time durations $T_{Burst}$ for signal portions A1, A2, A3, . . . and B1, B2, B3, . . . are of equal length. Time duration $T_{Burst}$ of signal portions A1, A2, A3, . . . is illustrated in FIG. 4 by a solid line and time duration $T_{Burst}$ of signal portions B1, B2, B3, . . . is illustrated by a dashed line.

The frequency within a signal portion A1, A2, A3, . . . or B1, B2, B3, . . . may be a constant carrier frequency $f_T(t)$, but it may also be a constant carrier frequency $f_T(t)$ modulated by a modulation frequency.

The individual signal portions A1, A2, A3, . . . of first signal portion sequence A(t) differ in their frequency or their carrier frequency $f_T(t)$ in each case by a differential frequency $f_{Hub,A}/(N-1)$, $f_{Hub,A}$ being the difference between the carrier frequency of first signal portion A1 of first signal portion sequence A(t) and the carrier frequency of the Nth signal portion of the first signal portion sequence A(t), and N being the number of signal portions A1, A2, A3, . . . of first signal portion sequence A(t). The individual signal portions B1, B2, B3, . . . of first signal portion sequence B(t) differ in their frequency or their carrier frequency $f_T(t)$ in each case by a differential frequency $f_{Hub,B}/(N-1)$, $f_{Hub,B}$ being the difference between the carrier frequency of first signal portion B1 of second signal portion sequence B(t) and the carrier frequency of the Nth signal portion of the second signal portion sequence B(t), and N being the number of signal portions B1, B2, B3, . . . of first signal portion sequence B(t). It may be provided to choose the differential frequency $f_{Hub,A}/(N-1)$ of the first signal portion sequence A(t) to differ from the differential frequency $f_{Hub,B}/(N-1)$ of the second signal portion sequence B(t), e.g., by at least 5%, e.g., by at least 10%.

Additionally, a frequency shift $f_{shift}$ may be provided between signal portion A1 of first signal portion sequence A(t) and signal portion B1 of second signal portion sequence B(t).

Accordingly, first signal portion sequence A(t) results in $$A(t) = \sum_{n=0}^{N-1} \cos\left(2\pi \cdot \left(f_{TA1} + \frac{n}{N-1} \cdot f_{Hub,A}\right) \cdot t\right) \cdot rect\left(\frac{t}{T_{burst}} - \frac{1}{2} - 2n\right)$$

and the second signal portion sequence B(t) in $$B(t) = \sum_{n=0}^{N-1} \cos\left(2\pi \cdot \left(f_{TA1} + f_{Shift} + \frac{n}{N-1} \cdot f_{Hub,B}\right) \cdot t\right) \cdot rect\left(\frac{t}{T_{Burst}} - \frac{1}{2} - (2n+1)\right)$$

where $f_{TA1}$ refers to the carrier frequency of signal portion A1 and rect refers to the rectangle function.

The transmission signal s(t) thus results in $$s(t) = A(t) + B(t)$$

Via a coupler 32, transmission signal s(t) is supplied to a mixer 38 for mixing transmission signal s(t) and reflection signal r(t). Mixer 38 outputs an inphase signal I(t).

Via another coupler 33, transmission signal s(t) is additionally supplied to a phase shifter 37, which shifts the phase of transmission signal s(t) with respect to the carrier frequency by 90°, that is, by n/2. The phase-shifted transmission signal is supplied to a mixer 39 for mixing the phase-shifted transmission signal and the reflection signal r(t), which is supplied to mixer 39 via a coupler 34. Mixer 39 outputs a quadrature signal Q(t).

Inphase signal I(t) and quadrature signal Q(t) are mixed signals in the present context.

Radar device 30 has a multiplicator 42, which is used to multiply quadrature signal Q(t) by the complex number j to yield jQ(t). I(t) and jQ(t) are added to form a complex mixed signal m(t). Complex mixed signal m(t) is a mixed signal in the present context. Radar device 30 additionally has a frequency analyzer 43, which is used to form a spectrum M(κ) of complex mixed signal m(t) over frequency κ. Using a detector 44, the dominating frequency $κ_A$ of mixed signal m(t) is ascertained with respect to first signal sequence A(t), and the dominating frequency $κ_B$ of mixed signal m(t) is ascertained with respect to second signal sequence B(t).

The processing of the individual signal sequences A(t) and B(t) may occur separately by temporal separation such that with the aid of mixers 38 and 39 first signal portion sequence A(t) is mixed with a portion of first signal portion sequence A(t) (of reflection signal r(t)) reflected by the at least one object 20 to form a first mixed signal $I_A(t)$, $Q_A(t)$ or $m_A(t)$, and second signal portion sequence B(t) is mixed with a portion of second signal portion sequence B(t) (of reflection signal r(t)) reflected by the at least one object 20 to form a second mixed signal $I_B(t)$, $Q_B(t)$ or $m_B(t)$. For this purpose, frequency analyzer 43 forms a complex spectrum $M_A(κ)$ of complex mixed signal $m_A(t)$ over frequency x and a complex spectrum $M_B(κ)$ of complex mixed signal $m_B(t)$ over frequency κ. Using detector 44, frequencies $κ_A$ of complex mixed signal $m_A(t)$ (that is, with respect to first signal sequence A(t)) and the frequencies $κ_B$ of complex mixed signal $m_B(t)$ (that is, with respect to second signal sequence B(t)) are ascertained.

Radar device 30 has an evaluator 45 for determining the distance R and/or the differential speed v. For this purpose, evaluator 45 solves the following system of equations:

$$κ_A = \frac{2v \cdot f_T}{c} \cdot (N-1) \cdot T_{Burst} - \frac{2R}{c} \cdot f_{Hub,A}$$

$$κ_B = \frac{2v \cdot f_T}{c} \cdot (N-1) \cdot T_{Burst} - \frac{2R}{c} \cdot f_{Hub,B}$$

where c is the speed of light.

In addition there may be a provision for detector 44 also to ascertain the difference Δψ between the phase of complex mixed signal $m_A(t)$ and the phase of complex mixed signal $m_B(t)$. For example—for determining distance R and/or speed difference v—evaluator 45 may be used to solve the following overdetermined system of equations, e.g., by a least square algorithm:

$$\Delta\psi = -2\pi \cdot \left( \frac{2v \cdot f_T \cdot T_{Burst}}{c} + \frac{2R \cdot f_{Shift}}{c} \right)$$

$$\kappa_A = \frac{2v \cdot f_T}{c} \cdot (N-1) \cdot T_{Burst} - \frac{2R}{c} \cdot f_{Hub,A}$$

$$\kappa_B = \frac{2v \cdot f_T}{c} \cdot (N-1) \cdot T_{Burst} - \frac{2R}{c} \cdot f_{Hub,B}$$

There may be an additional provision to use more than two signal portion sequences. Thus, for example, three signal portion sequences A(t), B(t) und C(t) of different differential frequency $f_{Hub,A}/(N-1)$, $f_{Hub,B}/(N-1)$ and $f_{Hub,C}/(N-1)$ may be used and suitably emitted and processed. For example—for determining distance R and/or speed difference v—evaluator 45 may be used to solve, for example, the following overdetermined system of equations, for example, by a least square algorithm:

$$\kappa_A = \frac{2v \cdot f_T}{c} \cdot (N-1) \cdot T_{Burst} - \frac{2R}{c} \cdot f_{Hub,A}$$

$$\kappa_B = \frac{2v \cdot f_T}{c} \cdot (N-1) \cdot T_{Burst} - \frac{2R}{c} \cdot f_{Hub,B}$$

$$\kappa_C = \frac{2v \cdot f_T}{c} \cdot (N-1) \cdot T_{Burst} - \frac{2R}{c} \cdot f_{Hub,C}$$

$$\Delta\psi_{AB} = -2\pi \cdot \left( \frac{2v \cdot f_T \cdot T_{Burst}}{c} + 2R \cdot \frac{f_{T,B} - f_{T,A}}{c} \right) \text{ where } f_{T,B} - f_{T,A} =: f_{Shift,BA}$$

$$\Delta\psi_{AC} = -2\pi \cdot \left( \frac{2v \cdot f_T \cdot T_{Burst}}{c} + 2R \cdot \frac{f_{T,C} - f_{T,A}}{c} \right) \text{ where } f_{T,C} - f_{T,A} =: f_{Shift,CA}$$

Accordingly there may be a provision to use, appropriately emit and process, for example, four signal portion sequences A(t), B(t), C(t) and D(t) of different differential frequency $f_{Hub,A}/(N-1)$, $f_{Hub,B}/(N-1)$, $f_{Hub,C}/(N-1)$ and $f_{Hub,D}/(N-1)$. For example—for determining distance R and/or speed difference v—evaluator 45 may be used to solve, for example, the following overdetermined system of equations, for example, by a least square algorithm:

$$\kappa_A = \frac{2v \cdot f_T}{c} \cdot (N-1) \cdot T_{Burst} - \frac{2R}{c} \cdot f_{Hub,A}$$

$$\kappa_B = \frac{2v \cdot f_T}{c} \cdot (N-1) \cdot T_{Burst} - \frac{2R}{c} \cdot f_{Hub,B}$$

$$\kappa_C = \frac{2v \cdot f_T}{c} \cdot (N-1) \cdot T_{Burst} - \frac{2R}{c} \cdot f_{Hub,C}$$

$$\kappa_D = \frac{2v \cdot f_T}{c} \cdot (N-1) \cdot T_{Burst} - \frac{2R}{c} \cdot f_{Hub,D}$$

$\Delta\psi_{AB}$ = see above $\Delta\psi_{AC}$ = see above $$\Delta\psi_{AD} = -2\pi \cdot \left( \frac{2v \cdot f_T \cdot T_{Burst}}{c} + 2R \cdot \frac{f_{T,D} - f_{T,A}}{c} \right) \text{ where } f_{T,D} - f_{T,A} =: f_{Shift,DA}$$

In addition, a different time duration may be provided for the signal portions of different signal sequences.

Figure 5:
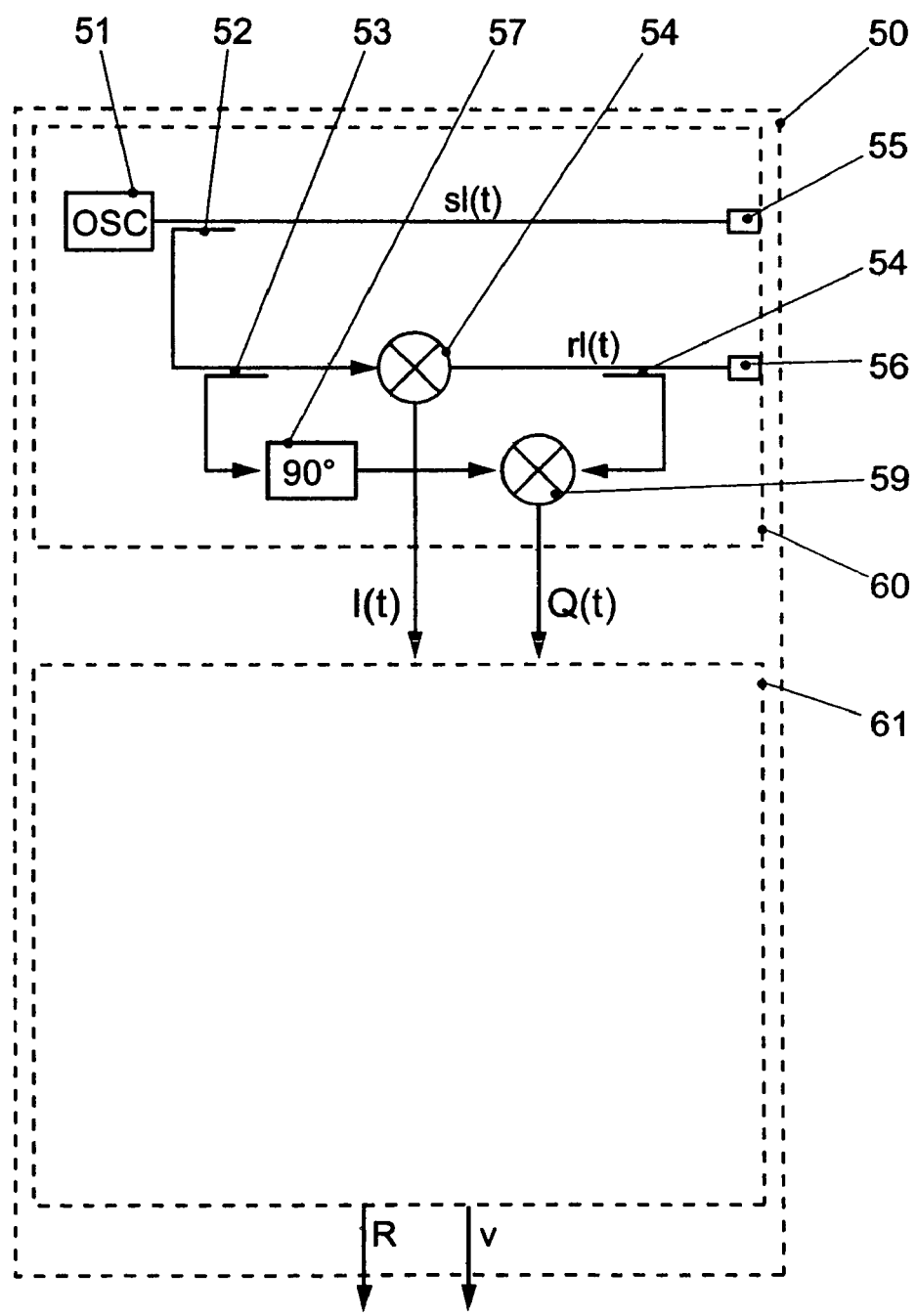
FIG. 5 illustrates an exemplary embodiment of an optical measuring device.

FIG. 5 illustrates an exemplary embodiment for an optical measuring device 50 for the improved measurement of speed difference v or distance R. Optical measuring device 50 has an optical sensor 60 and an evaluation device 61, which corresponds essentially to evaluation device 41. Optical measuring device 50 has an oscillator or a signal generator 51 for producing a transmission signal sl(t), a laser 55 for emitting light at the frequency of transmission signal sl(t) and a photoelement 56 for receiving a light reflected by at least one object such as obstacle 20 and for producing a reflection signal rl(t) at a frequency corresponding to the frequency of the reflected light. The transmission signal sl(t) produced by signal generator 51 corresponds to transmission signal s(t), but is located in another frequency range. Via a coupler 52, transmission signal sl(t) is supplied to a mixer 58 for mixing transmission signal sl(t) and reflection signal rl(t). Mixer 58 outputs an inphase signal I(t).

Via another coupler 53, transmission signal sl(t) is additionally supplied to a phase shifter 57, which shifts the phase of transmission signal sl(t) with respect to the carrier frequency by 90°, that is, by π/2. The phase-shifted transmission signal is supplied to a mixer 59 for mixing the phase-shifted transmission signal and the reflection signal rl(t), which is supplied to mixer 59 via a coupler 54. Mixer 59 outputs a quadrature signal Q(t).

The elements, signals and frequency ranges in the Figures are drawn with simplicity and clarity in mind and not necessarily to exact scale. Thus, for example, the orders of magnitude of some elements, signals or frequency ranges are exaggerated in order to facilitate understanding

LIST OF REFERENCE CHARACTERS 1 motor vehicle
2, 3 bumper
4, 5 side mirror
6, 7 side door
8 hatchback
10, 14, 15, 16 distance and/or speed sensor
20 object or obstacle
30 radar device
51 signal generator
33, 34, 52, 53, 54 coupler
35 transmitting antenna
36 receiving antenna
57 phase shifter
39, 58, 89 mixer
40 radar device
41, 61 evaluation device
42 multiplier
43 frequency analyzer
44 detector
45 evaluator
50 optical measuring device
55 laser
56 photoelement
60 optical sensor
A, B signal sequence
A1, A2, A3, B1, B2, B3 signal portion
$f_{Hub,A}$, $f_{Hub,B}$ difference between the carrier frequency of the first signal portion of a signal portion sequence and the carrier frequency of the last signal portion of the signal portion sequence
$f_{shift}$ frequency shift
$f_T(t)$ carrier frequency
I(t) inphase signal
m(t) complex mixed signal M(κ) complex spectrum
Q(t) quadrature signal
R distance
r(t), rl(t) reflection signal
s(t), sl(t) transmission signal
t time
$T_{Burst}$ time duration
v speed difference
vF speed of the motor vehicle
vH speed of the obstacle Δψ difference in the phase of two mixed signals
κ frequency
$κ_A$, $κ_B$ measured frequency of a complex mixed signal

What is claimed is:

1. A measuring device for at least one of (a) measuring a distance between the measuring device and at least one object and (b) measuring a speed difference between the measuring device and the at least one object, comprising:
an emission device adapted to send a transmission signal that includes at least two signal portion sequences, each of a first signal portion sequence and a second signal portion sequence including at least two temporally alternating signal portions, the at least two signal portions of the first signal portion sequence differing in frequency by a first differential frequency, the at least two signal portions of the second signal portion sequence differing in frequency by a second differential frequency, wherein the first differential frequency of the first signal portion sequence differing from the second differential frequency of the second signal portion sequence.

2. The measuring device according to claim 1, wherein the measuring device is adapted to be arranged in a motor vehicle.

3. The measuring device according to claim 1, further comprising a reception device adapted to receive a reflection signal of the transmission signal reflected by the at least one object.

4. The measuring device according to claim 3, further comprising a mixer adapted to mix the first signal portion sequence with a portion of the first signal portion sequence of the reflection signal reflected by the at least one object to form a first mixed signal.

5. The measuring device according to claim 4, further comprising an evaluation device adapted to ascertain one of (a) a measured frequency and (b) frequencies of the first mixed signal.

6. The measuring device according to claim 5, wherein the evaluation device is adapted to determine the distance between the measuring device and the at least one object as a function of the one of (a) the measured frequency and (b) the frequencies of the first mixed signal.

7. The measuring device according to claim 5, the evaluation device is adapted to determine the speed difference between the measuring device and the at least one object as a function of the one of (a) the measured frequency and (b) the frequencies of the first mixed signal.

8. The measuring device according to claim 4, wherein the mixer is adapted to mix the second signal portion sequence with a portion of the second signal portion sequence of the reflection signal reflected by the at least one object to form a second mixed signal.

9. The measuring device according to claim 8, wherein the evaluation device is adapted to ascertain the one of (a) a measured frequency and (b) frequencies of the second mixed signal.

10. The measuring device according to claim 9, wherein the evaluation device is adapted to determine the distance between the measuring device and the at least one object as a function of the one of (a) the measured frequency and (b) the frequencies of the first mixed signal and of a dominating frequency of the second mixed signal.

11. The measuring device according to claim 9, wherein the evaluation device is adapted to determine the speed difference between the measuring device and the at least one object as a function of the one of (a) the measured frequency and (b) the frequencies of the first mixed signal and of the one of (a) the measured frequency and (b) the frequencies of the second mixed signal.

12. The measuring device according to claim 8, wherein the evaluation device is adapted to determine a difference between a phase of the first mixed signal and a phase of the second mixed signal.

13. The measuring device according to claim 12, wherein the evaluation device is adapted to determine the distance between the measuring device and the at least one object as a function of the difference between the phase of the first mixed signal and the phase of the second mixed signal.

14. The measuring device according to claim 12, wherein the evaluation device is adapted to determine the speed difference between the measuring device and the at least one object as a function of the difference between the phase of the first mixed signal and the phase of the second mixed signal.

15. A method for at least one of (a) measuring a distance between an emission device and at least one object and (b) measuring a speed difference between the emission device and the at least one object, comprising:
sending a transmission signal by the emission device including at least two signal portion sequences, each of a first signal portion sequence and a second signal portion sequence including at least two temporally alternating signal portions, the at least two signal portions of the first signal portion sequence differing in frequency by a first differential frequency, the at least two signal portions of the second signal portion sequence differing in frequency by a second differential frequency, the first differential frequency of the first signal portion sequence differing from the second differential frequency of the second signal portion sequence.

16. The method according to claim 15, further comprising receiving a reflection signal of the transmission signal reflected by the at least one object.

17. The method according to claim 16, further comprising mixing the first signal portion sequence with a portion of the first signal portion sequence of the reflection signal reflected by the at least one object to form a first mixed signal.

18. The method according to claim 17, further comprising ascertaining a dominating frequency of the first mixed signal.

19. The method according to claim 18, further comprising determining the distance between the emission device and the at least one object as a function of the dominating frequency of the first mixed signal.

20. The method according to claim 18, further comprising determining the speed difference between the emission device and the at least one object as a function of the dominating frequency of the first mixed signal.

21. The method according to claim 16, further comprising:
mixing the second signal portion sequence with a portion of the second signal portion sequence of the reflection signal reflected by the at least one object to form a second mixed signal; and
ascertaining a dominating frequency of the second mixed signal.

22. The method according to claim 21, further comprising determining the distance between the emission device and the at least one object as a function of a dominating frequency of the first mixed signal and the dominating frequency of the second mixed signal.

23. The method according to claim 21, further comprising determining the speed difference between the emission device and the at least one object as a function of a dominating frequency of the first mixed signal and the dominating frequency of the second mixed signal.

24. The method according to claim 21, further comprising determining a difference between a phase of the first mixed signal and a phase of the second mixed signal.

25. The method according to claim 24, further comprising determining the distance between the emission device and the at least one object as a function of the difference between the phase of the first mixed signal and the phase of the second mixed signal.

26. The method according to claim 24, further comprising determining the speed difference between the emission device and the at least one object as a function of the difference between the phase of the first mixed signal and the phase of the second mixed signal.

27. The method according to claim 15, wherein the emission device is arranged in a motor vehicle.

* * * * *